United States Patent
Hegde et al.

(10) Patent No.: US 11,271,393 B1
(45) Date of Patent: Mar. 8, 2022

(54) ADVANCED PROTECTION CIRCUIT FOR Q FACTOR SENSING PAD

(71) Applicant: STMicroelectronics Asia Pacific Pte Ltd, Singapore (SG)

(72) Inventors: Supriya Raveendra Hegde, Singapore (SG); Yannick Guedon, Singapore (SG); Huiqiao He, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 17/007,633

(22) Filed: Aug. 31, 2020

(51) Int. Cl.
  *H02H 9/04* (2006.01)
  *H02M 7/219* (2006.01)
  *H02J 50/10* (2016.01)

(52) U.S. Cl.
  CPC ............ *H02H 9/04* (2013.01); *H02J 50/10* (2016.02); *H02M 7/219* (2013.01)

(58) Field of Classification Search
  CPC ........... H02H 9/04; H02J 50/10; H02M 7/219
  USPC ....................................................... 307/104
  See application file for complete search history.

(56) References Cited

U.S. PATENT DOCUMENTS

| | | | | |
|---|---|---|---|---|
| 9,130,369 | B2 * | 9/2015 | Kallal | ............... H02J 5/005 |
| 10,063,103 | B2 | 8/2018 | Su | |
| 2012/0200967 | A1 * | 8/2012 | Mikolajczak | ............ H02H 3/20 |
| | | | | 361/79 |
| 2012/0223591 | A1 * | 9/2012 | Cheon | ............... H02J 5/005 |
| | | | | 307/104 |
| 2013/0020876 | A1 * | 1/2013 | Kim | ............... H02J 50/80 |
| | | | | 307/104 |
| 2013/0182461 | A1 | 7/2013 | Muratov | |

FOREIGN PATENT DOCUMENTS

| KR | 1020180012675 A | 2/2018 |
|---|---|---|
| WO | 2013164831 A1 | 1/2013 |
| WO | 2019172576 A1 | 9/2019 |

OTHER PUBLICATIONS

EPO Search Report and Written Opinion for priority application, EP Appl. 21192944.3, report dated Dec. 8, 2021, 10 pages.

* cited by examiner

*Primary Examiner* — Alfonso Perez Borroto
(74) *Attorney, Agent, or Firm* — Crowe & Dunlevy

(57) ABSTRACT

A wireless-power-system includes a bridge-rectifier having first and second inputs coupled to first and second terminals of a coil, and an output coupled to a rectified voltage node. An excitation circuit is coupled to the first input. A protection circuit has a first connection node capacitively coupled to the first terminal. The protection circuit, in Q-factor measurement mode, clamps the first connection node when the first input is coupled to ground, and connects the first connection node to the rectified voltage node when the first input is coupled to a supply voltage. The protection circuit, in wireless power mode, is acting as one leg of the rectifier. A pass gate circuit is coupled between the first connection node and a sense node, and a sensing circuit is coupled to the sense node and measures a Q-factor of the wireless power system when the protection circuit is in Q-factor measurement mode.

16 Claims, 3 Drawing Sheets

ADVANCED PROTECTION CIRCUIT FOR Q FACTOR SENSING PAD

TECHNICAL FIELD

This disclosure is related to the field of wireless power transmission and, in particular, to a protection circuit for Q-factor measurement circuitry within a wireless power transmission system.

BACKGROUND

Portable electronic devices, such as smartphones, smartwatches, audio output devices (earbuds, headphones), and wearables operate on battery power, and not from wired power transmitted thereto over wired transmission lines and distribution systems. The batteries used for such devices are typically rechargeable and, therefore, a way to recharge the power of such batteries is necessary.

Most portable electronic devices include a charging port, typically conforming to the Micro USB or USB-C standards, into which a power cord connected to a power source can be inserted to provide for recharging of their batteries. However, such charging ports may make it difficult to enhance the water resistance of the electronic device, and are subject to damage from repeated use. In addition, some smaller portable electronic devices (for example, earbuds and smartwatches) may lack the available space to provide for a charging port. Still further, some users may find it cumbersome to plug a power cord into the charging port of an electronic device to charge the battery of that device.

Therefore, to address these issues, wireless power transmission has been developed. As shown in FIG. 1, a wireless power transmission system 10 may be comprised of a first device 11 and a second device 15. The first device 11 may be a device to be wirelessly charged, such as a charging case for a pair of wireless earbuds, and the second device 15 may be a device capable of both wireless power transmission and wireless power reception, such as a smartphone.

The first device 11 includes a receiver coil Ls (a secondary; the capacitance Cs represents the capacitance of the receiver coil) in which a time-varying current is induced by a time-varying electric field, and receiver hardware 12 that rectifies, regulates, and makes use of the time-varying current induced in the receiver coil Ls to provide power to the device 11, for example to charge its battery.

The second device 15 includes a controlled switching bridge circuit (operable as either a bridge rectifier or a DC-AC inverter) 16 coupled to a transceiver coil Lxcvr at nodes Ac1 and Ac2, with a discrete capacitor Cxcvr being used to tune the second device 15. The controlled switching bridge circuit 16 is comprised of transistors T1-T4 controlled by gate voltages G1-G4.

A tank capacitor Ctank is coupled between node Nin and node N. A voltage regulator 17 has an input coupled to node Nin and an output coupled to node Nout. A battery 18 is selectively coupled between node Nout and node N by a switch SW1, and is selectively coupled between the node N and node Nin by a switch SW2. The switches SW1 and SW2 operate out of phase with one another; switch SW1 is closed while switch SW2 is opened when the second device 15 operates as a receiver in a power reception mode with the circuit 16 functioning as an AC-DC rectifier and the regulator functioning to generate the regulated voltage Vreg for charging the battery of the second device 15, and switch SW1 is opened while switch SW2 is closed when the second device 15 operates as a transmitter in a power transmission mode with the circuit 16 functioning as a DC-AC inverter powered by the battery in a mode to transfer power supplied by battery 18 to the first device 11. A controller 19 generates the gate voltages G1-G4 for controlling the bridge 16 to operate in the desired rectifier/inverter mode.

When the second device 15 operates as a receiver, the controlled switching bridge circuit 16 rectifies the AC current flowing in transceiver coil Lxcvr to produce a DC current that charges the tank capacitor Ctank connected to the node Nin, and a rectified voltage Vrect is formed across the tank capacitor Ctank. The voltage regulator 17 produces a regulated output voltage Vreg at its output node Nout, which is provided to the battery 18 to thereby charge the battery 18.

When the second device 15 operates as a transmitter, the voltage of the battery 18 is applied to the node Nin by switch SW2 and becomes the voltage Vrect. Then, the gate voltages G1-G4 are driven by the controller 19 so as to generate a time-varying current flowing through the transceiver coil Lxcvr.

In such wireless power transmission systems 10, Q-factor measurement can be performed so as to enable object detection as well as assessment of the efficiency of wireless power transfer. Q-factor measurement may be performed by sweeping the frequency of the time-varying electric field generated by the transceiver 15 while measuring the peak voltage developed at the node AC1, and then dividing the peak voltage by the DC voltage produced at node Nin. To accommodate this, a sensing block 9 is coupled to the coil Lxcvr. Q-factor measurement cycles may be interleaved with power transmission/reception cycles, but do not occur simultaneously.

A problem arises in that, without protection, components of the sensing block 9, such as transistors, may be damaged during normal power transmission/reception cycles. As such, further development is needed.

SUMMARY

A wireless power system includes: a coil having first and second terminals; a bridge rectifier having a first input and a second input coupled to the first terminal and second terminal of the coil, respectively, and having an output coupled to a rectified voltage node; an excitation circuit coupled to the first input of the coil; and a protection circuit having a first connection node coupled to the first terminal of the coil through a capacitor.

The protection circuit, when in a Q-factor measurement mode, is configured to: clamp the first connection node when the first input of the bridge rectifier is coupled to ground, and connect the first connection node to the rectified voltage node when the first input of the bridge rectifier is coupled to a supply voltage.

The protection circuit, when in a wireless power mode, is configured to be disabled.

The wireless power system also includes a pass gate circuit coupled between the first connection node of the protection circuit and a sense nod; and a sensing circuit coupled to the sense node and configured to measure a Q-factor of the wireless power system when the protection circuit is in the Q-factor measurement mode.

Also disclosed herein is method of operating a wireless power system including a bridge rectifier. The method includes, in a wireless power mode: receiving a time-varying electric field at a coil; operating a bridge rectifier to rectify an AC signal induced in the coil by the time-varying electric field to produce a rectified voltage at a voltage rectification node; clamping a first connection node coupled to the coil by a capacitance to ground when a low-side transistor of the bridge rectifier is coupled to ground; and connecting the first connection node to the rectified voltage when a high-side transistor of the bridge rectifier directly electrically connected to the low-side transistor is turned on.

The method also includes, in a Q-factor measurement mode: turning off high-side transistors of the bridge rectifier, and turning on low-side transistors of the bridge rectifier; turning on pass gate transistors to couple the first connection node to a sensing node; exciting the coil; ceasing to excite the coil, and sensing a voltage at the first connection node; and determining the Q-factor of the wireless power system based upon the voltage sensed at the first connection node.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
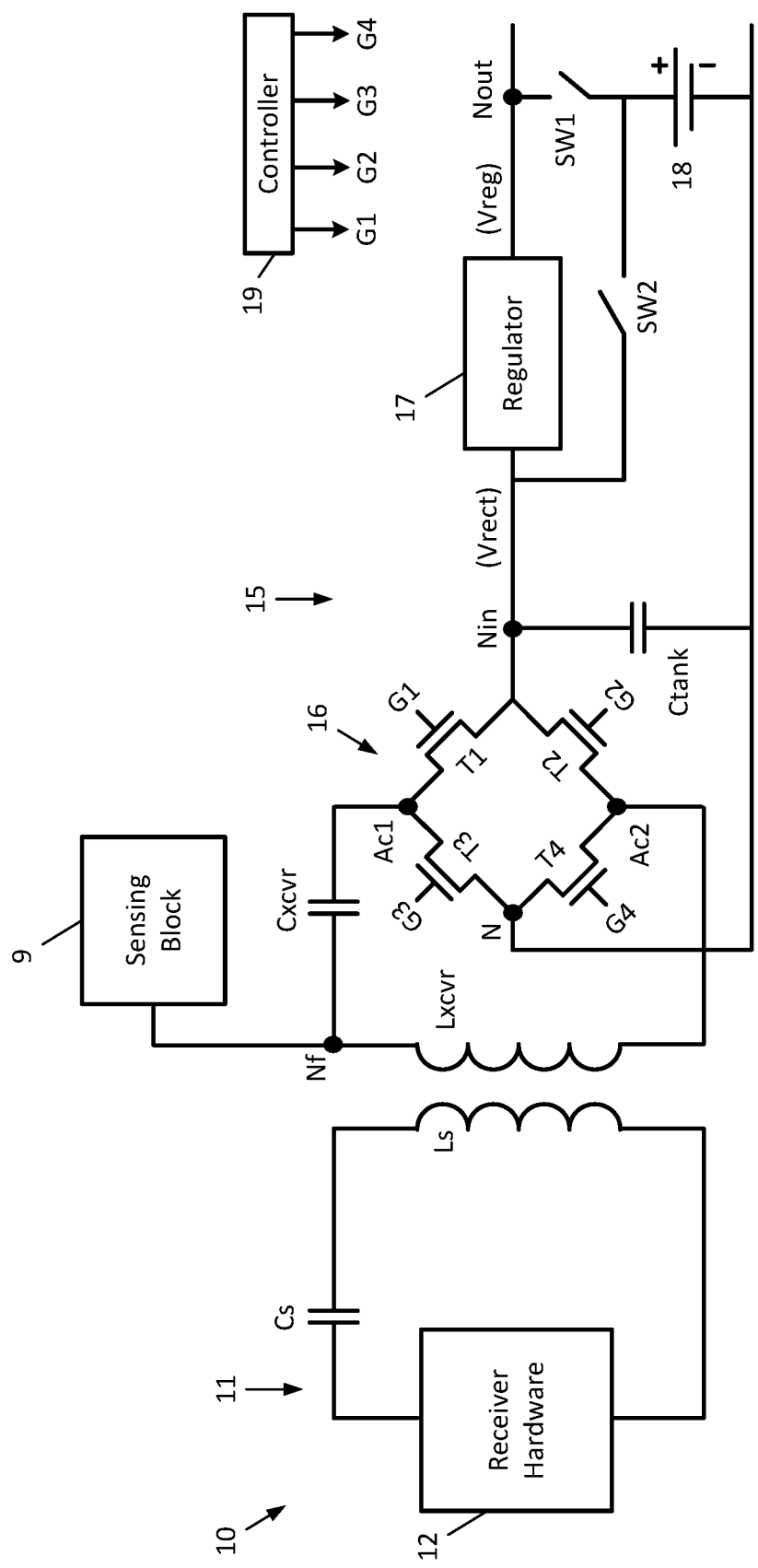
FIG. 1 is a schematic block diagram of a wireless power transmission system in accordance with the prior art.
Figure 2:
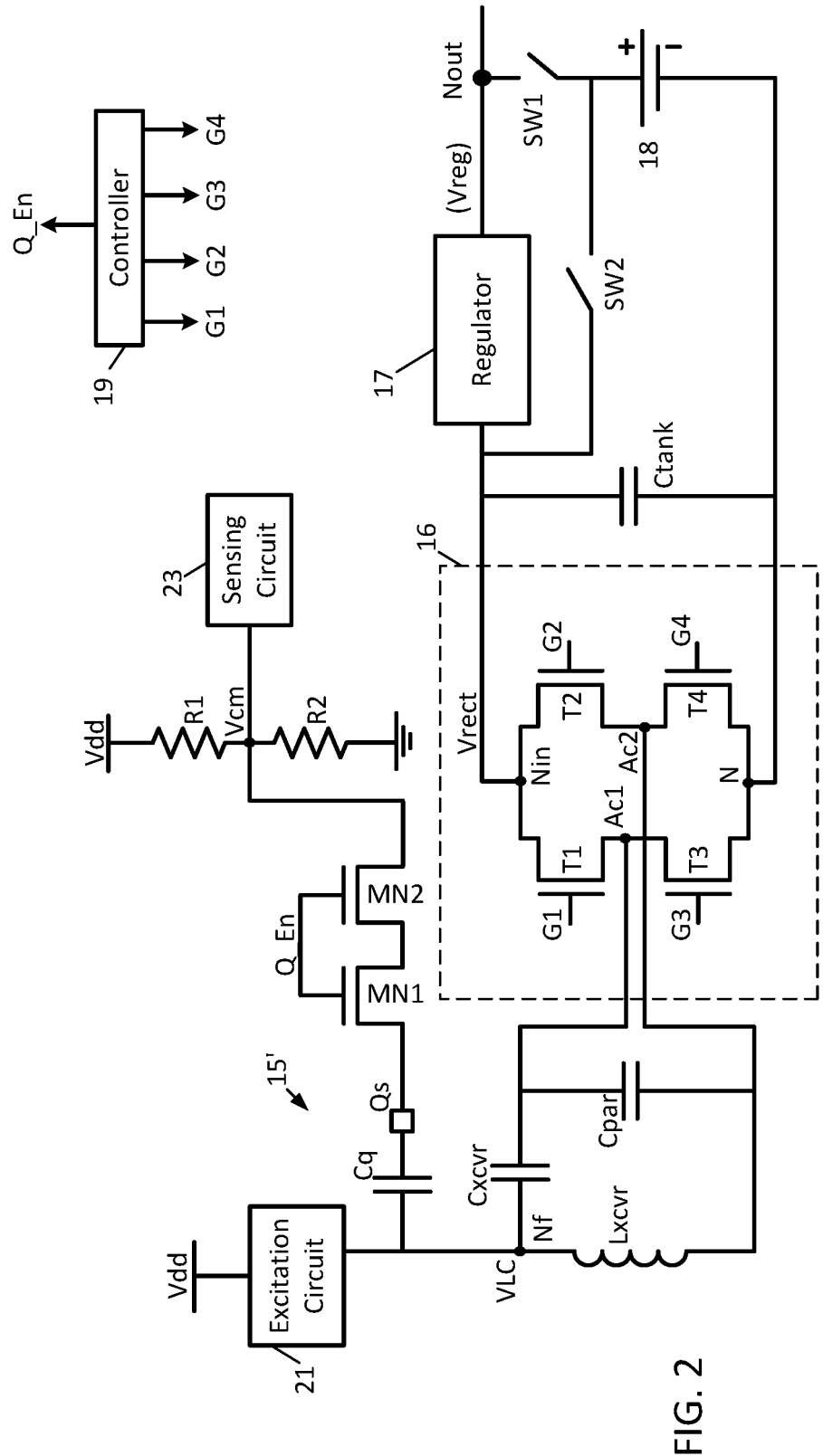
FIG. 2 is a schematic block diagram of a transceiver device described herein, such as may be used in the place of the transceiver device of the wireless power transmission system of FIG. 1.

Described herein with reference to FIG. 2 is a transceiver device 15', such as may be used with the wireless power transmission system 10 of FIG. 1.

The transceiver device 15' includes a controlled switching bridge circuit (operable as either a bridge rectifier or a DC-AC inverter) 16 coupled to a transceiver coil Lxcvr at nodes Ac1 and Ac2, with the Cxcvr representing the tuning capacitor to align the impedance matching, and the capacitor Cpar representing the parasitic capacitance purposefully added between nodes Ac1 and Ac2 to tune the impedance of the system The controlled switching bridge circuit 16 is comprised of transistors T1-T4 controlled by gate voltages G1-G4. In greater detail: the transistor T1 has a drain coupled to node Nin, a source coupled to node Ac1, and a gate coupled to gate voltage G1; the transistor T3 has a drain coupled to node Ac1, a source coupled to node N (which may be ground or another reference voltage), and a gate coupled to gate voltage G3; the transistor T2 has a drain coupled to node Nin, a source coupled to node Ac2, and a gate coupled to gate voltage G2; and the transistor T4 has a drain coupled to node Ac2, a source coupled to node N, and a gate coupled to gate voltage G4.

A tank capacitor Ctank is coupled between node Nin and node N. A voltage regulator 17 has an input coupled to node Nin and an output coupled to node Nout. A battery 18 is selectively coupled between node Nout and node N by a switch SW1, and is selectively coupled between the node N and node Nin by a switch SW2. The switches SW1 and SW2 operate out of phase with one another; switch SW1 is closed while switch SW2 is opened when the transceiver device 15' operates as a receiver in a power reception mode with the circuit 16 functioning as an AC-DC rectifier and the regulator functioning to generate the regulated voltage Vreg for charging the battery 18, and switch SW1 is opened while switch SW2 is closed when the transceiver device 15' operates as a transmitter in a power transmission mode with the circuit 16 functioning as a DC-AC inverter powered by the battery 18. A controller 19 generates the gate voltages G1-G4 for controlling the bridge 16 to operate in the desired rectifier/inverter mode.

When the transceiver device 15' operates as a receiver, the controlled switching bridge circuit 16 rectifies the AC current to produce a DC current that charges the tank capacitor Ctank connected to the node Nin, and a rectified voltage Vrect is formed across the tank capacitor Ctank. The voltage regulator 17 produces a regulated output voltage Vreg at its output node Nout, which is provided to the battery 18 to thereby charge the battery 18.

When the transceiver device 15' operates as a transmitter, the voltage of the battery 18 is applied to the node Nin by switch SW2 and becomes the voltage Vrect. Then, the gate voltages G1-G4 are driven by the controller 19 so as to generate a time-varying current flowing through the transceiver coil Lxcvr. Details of this control scheme may be found in U.S. patent application Ser. No. 16/669,068, filed Oct. 30, 2019, the contents of which are incorporated by reference in their entirety.

An excitation circuit 21 is coupled between supply Vdd voltage and the transceiver coil Lxcvr at node Ac1 (because capacitances Cxcvr and Cpar are representative capacitances and not physical components).

A capacitor Cq is coupled between the excitation circuit 21 and a pad Qs. An n-channel transistor MN1 has a drain coupled to the pad Qs, a source coupled to the source of an n-channel transistor MN2, and a gate coupled to the Q-factor measurement enable signal Q_En. The transistor MN2 has its source coupled to the source of the transistor MN1, its drain coupled to a tap between resistors R1 and R2 (which are series coupled between Vdd and ground), and its gate coupled to the Q-factor measurement enable signal Q_En. A sensing circuit 23 is coupled to the tap between resistors R1 and R2.

The second device 15' may be operated in either transceiver mode (Rx or Tx) or Q-factor measurement mode.

In Q-factor measurement mode, the Q-factor measurement enable signal Q_En is asserted by the controller 19 to turn on transistors MN1 and MN2 to thereby establish a connection from the Qs pad to the center tap of the series connected resistors R1 and R2. In addition, the transistors T3 and T4 are simultaneously turned on by the controller 19 asserting the gate voltages G3 and G4, thereby shorting the nodes Ac1 and Ac2 to ground. Then, the excitation circuit 21 excites the coil Lxcvr until it reaches a steady state. Once excitation is stopped, the response of the voltage VLC at node Nf (which will be a decaying sine wave oscillating about a common mode voltage Vcm set at the tap between the resistors R1 and R2) is sensed by the sensing circuitry 23 through the capacitor Cq. The amplitude and timing information sensed by the sensing circuitry 23 can then be used to determine the Q-factor of the second device 15'.

During transceiver mode, the controller 19 generates the control signals G1-G4 so as to cause the circuit 16 to act as either a receiver or inverter, as described above. Additionally, during transceiver mode, the Q-factor measurement enable signal Q_En is deasserted, turning off transistors MN1 and MN2 to effectively isolate node Qs from Vcm while circuitry internal to the excitation circuit 21 effectively blocks the transceiver signal from the excitation circuit 21, and the switching action of the circuit 16 results in the voltage VLC across the coil Lxcvr switching between positive and negative maximum magnitudes, such as −50V and 50V. Since transistors MN1 and MN2 are off, the pad Qs floats, and therefore follows the voltage VLC as it is AC coupled to node Qs through capacitor Cq. This can be an issue, as it can result in the transistor MN1 and in turn MN2 breaking down. In particular, when the magnitude of the voltage at the pad Qs goes sufficiently positive, the transistor MN1 can break down, and when the magnitude of the voltage at the pad Qs goes sufficiently negative, the transistor MN1 can turn on unintentionally. This can be addressed by clamping the pad Qs to ground during transceiver mode using suitable clamping circuitry.

However, clamping circuitry dissipates power, and the level of power dissipation would not be negligible for certain scenarios where wireless power transfer with a high degree of efficiency is desired.

Figure 3:
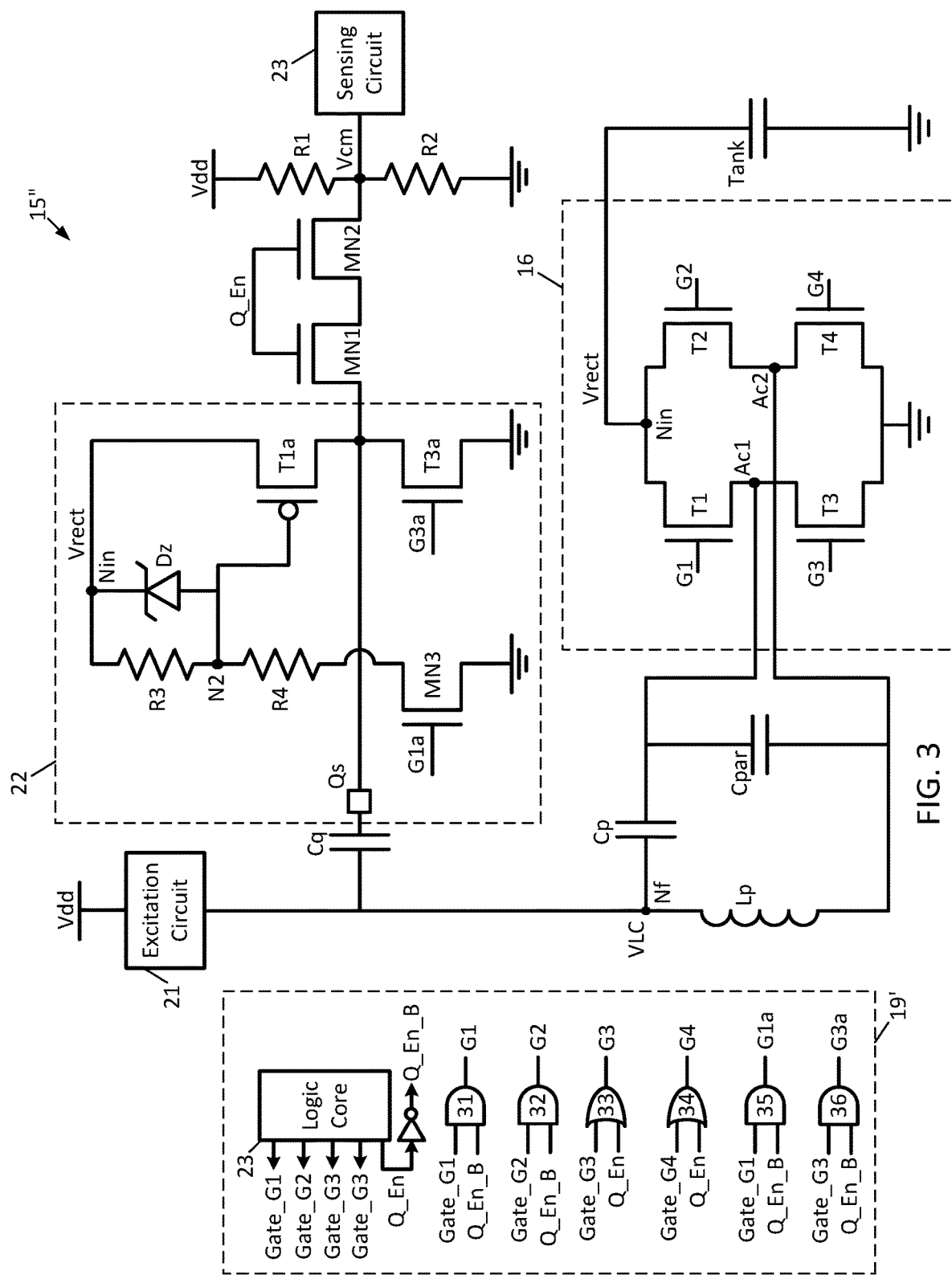
FIG. 3 is a schematic block diagram of a transceiver device described herein that includes a protection circuit, such as may be used in the place of the transceiver device of the wireless power transmission system of FIG. 1.

So as to permit Q-factor measurement in applications where wireless power transfer with a high degree of efficiency is desired, the transceiver device 15" of FIG. 3 has been developed.

Referring now to FIG. 3, the transceiver device 15" has the same connections and topology as the transceiver device 15' of FIG. 2, except a protection circuit 22 has been coupled between the pad Qs and the drain of the transistor MN1, and the controller 19' functionality is modified.

The controller 19' includes a logic core 23 generating Gate_G1, Gate_G2, Gate_G3, and Gate_G4 control signals, as well as the Q-factor measurement enable signal Q_En, which is inverted to produce Q_En_B. A first AND gate 31 performs a logical-AND operation on Gate_G1 and Q_En_B to produce the gate voltage G1. A second AND gate 32 performs a logical-AND operation on Gate_G2 and Q_En_B to produce the gate voltage G2. An OR gate 33 performs a logical-OR on Gate_G3 and Q E to produce the gate voltage G3. An OR gate 34 performs a logical-OR on Gate_G4 and Q_En to produce the gate voltage G4. A third AND gate 35 performs a logical-AND operation on Gate_G1 and Q_En_B to produce the gate voltage G1$a$. A fourth AND gate 36 performs a logical-AND operation on Gate_G3 and Q_En_B to produce the gate voltage G3$a$.

The protection circuit 22 includes a p-channel transistor T1$a$ having a source coupled to node Nin (and therefore the source of T1$a$ is coupled to the drains of transistors T1 and T2), a drain coupled to the Qs pad, and a gate coupled to node N2. The protection circuit 22 also includes an n-channel transistor T3$a$ having a gate coupled to the gate voltage G3$a$, a drain coupled to the drain of transistor T1$a$, and a source coupled to ground. A zener diode Dz has an anode coupled to node N2 and a cathode coupled to node Nin. A resistor R3 is coupled between nodes Nin and N2 in parallel with diode Dz. A resistor R4 is coupled between node N2 and a drain of n-channel transistor MN3. The n-channel transistor MN3 has its source coupled to ground and its gate coupled to the gate voltage G1$a$.

During transceiver mode, the Q-factor measurement enable signal Q_En is driven by the logic core 23 to a logic low, and therefore Q_En_B is driven to a logic high. Also, during transceiver mode, the logic core 23 generates the Gate_G1, Gate_G2, Gate_G3, and Gate_G4 control signals so as to cause the bridge 16 to either rectify a time varying current induced in the coil Lp, or to generate a time-varying current in the coil Lp to thereby generate a time varying electric field, depending on whether in receiver mode or transmitter mode.

Since the transistor T3$a$ is driven by the gate voltage G3$a$ and Q_En_B is high in transceiver mode, it is apparent that in transceiver mode, the transistor T3$a$ turns on when transistor T3 turns on and turns off when transistor T3 turns off. Similarly, the transistor MN3 is turned on when the gate voltage G1$a$ goes high due to G1 and Q_En_B being high, thereby sinking current from node N2 to turn on the transistor T1$a$, so the transistor T1$a$ turns on when the transistor T1 turns on. When Vrect is positive, the transistor T1 is off; therefore, when Vrect exceeds the breakdown voltage of the zener diode Dz, the zener diode Dz breaks down and ties the gate of transistor T1$a$ to Vrect, turning off the transistor T1$a$ when the transistor T1 is off.

As stated, during transceiver mode, the Q-factor measurement enable signal Q_En is deasserted. This turns off transistors MN1 and MN2. Since node Qs is AC coupled to the voltage VLC through the capacitor Cq, the voltage at node Qs follows the voltage VLC. However, despite this, absent the protection circuit 22 (if node Qs were to be directly electrically connected to the drain of the transistor MN1), the voltage on node Qs could spike sufficiently high to damage the transistors MN1 and MN2, unless the transistors MN1 and MN2 were specifically designed to hold off the potential voltages on node Qs. However, this would have the negative effect of impairing the ability of the transistors MN1 and MN2 to provide a low impedance path for an ESD current to follow should an ESD event occur.

Since the voltage at node Qs generally follows the voltage VLC (which follows the voltage at node Ac1) during transceiver mode, it can therefore be appreciated that if the circuitry at node Qs were to be similar to the structure at node Ac1, the voltage at Qs would closely or even exactly follow the voltage at the node Ac1, which is controlled. It is for this reason that the protection circuit 22 includes the transistors T1$a$ and T3$a$ coupled in series between node Nin and ground.

So as to protect the transistors MN1 and MN2 from the floating voltage on the node Qs in transceiver mode, while not having the transistors T1$a$ and T3$a$ substantially contribute to the rectification process, Cq is dimensioned to be substantially smaller than Cp (for example, by a factor of 1000), and the size of the transistors T1$a$ and T3$a$ is smaller than the size of the transistors T1 and T3 by the same factor (here, 1000). The result is that the current flowing through transistors T1$a$ and T3$a$ is lower than the current flowing through transistors T1 and T3 by the same factor (here, 1000), but the voltage at node Qs is controlled—the voltage Qs is clamped to ground by the transistor T3$a$ when it would otherwise go negative, and the voltage Qs is forced to Vrect through transistor T1$a$ when it would otherwise fly above Vrect. During the occurrence of an ESD event at node Qs, the transistors T1$a$ and T3$a$ provide a low resistive path to ground and Vrect, and therefore this design of the protection circuit 22 also provides for ESD protection.

During the Q-factor measurement mode, the Q-factor measurement enable signal Q_En is asserted, with the result being that the gate voltages G1 and G2 are deasserted to turn off transistors T1 and T2, and the gate voltages G3 and G4 are turned on to turn on transistors T3 and T4. However, since Q_En_B is deasserted, this means that the gate voltages G1$a$ and G3$a$ are turned off, turning off transistors G1$a$ and G3$a$. As a result, the protection circuit 22 becomes transparent during Q-factor measurement mode. Q-factor measurement proceeds as described above.

In summary, the transistors T1a and T3a contribute to but 1/1000th of the rectification process while protecting the transistors MN1 and MN2 from damage when in the transceiver mode, are transparent in Q-factor measurement mode, and act to provide ESD protection at node Qs.

In the example given, the transistors T1a and T3a are 1/1000th the size of the transistors T1 and T3, but other size differences are envisioned, dependent upon the desired ESD protection specifications.

Also note that while transistor T1 is an n-channel transistor, the transistor T1a can be (and is, in this example) a p-channel transistor due to its substantially smaller size, providing for the simple gate driving scheme involving transistor MN3, resistors R3 and R4, and the zener diode Dz.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A wireless power system, comprising:
a coil having first and second terminals;
a bridge rectifier having a first input and a second input coupled to the first terminal and the second terminal of the coil, respectively, and having an output coupled to a rectified voltage node;
an excitation circuit coupled to the first input of the bridge rectifier;
a protection circuit having a first connection node coupled to the first terminal of the coil through a capacitor,
wherein the protection circuit, when in a Q-factor measurement mode, is configured to:
clamp the first connection node when the first input of the bridge rectifier is coupled to ground, and
connect the first connection node to the rectified voltage node when the first input of the bridge rectifier is coupled to a supply voltage;
wherein the protection circuit, when in a wireless power mode, is configured to be disabled;
a pass gate circuit coupled between the first connection node of the protection circuit and a sense node; and
a sensing circuit coupled to the sense node and configured to measure a Q-factor of the wireless power system when the protection circuit is in the Q-factor measurement mode.

2. The wireless power system of claim 1,
wherein the bridge rectifier comprises a first transistor pair and a second transistor pair coupled between the rectified voltage node and ground;
wherein the protection circuit comprises a pair of protection transistors coupled between the rectified voltage node and ground, with a tap between the pair of protection transistors being coupled to the first connection node of the protection circuit; and
wherein each transistor of the pair of protection transistors is turned on when a corresponding one of the first transistor pair of the bridge rectifier is turned on and turned off when the corresponding one of the first transistor pair is turned off.

3. The wireless power system of claim 1,
wherein the bridge rectifier comprises:
a first n-channel transistor coupled between the rectified voltage node and the first input of the bridge rectifier;
a second n-channel transistor coupled between the rectified voltage node and the second input of the bridge rectifier;
a third n-channel transistor coupled between the first input of the bridge rectifier and ground; and
a fourth n-channel transistor coupled between the second input of the bridge rectifier and ground;
wherein the protection circuit comprises:
a p-channel transistor coupled between the rectified voltage node and the first connection node of the protection circuit, wherein the p-channel transistor of the protection circuit is configured to turn on when the first n-channel transistor of the bridge rectifier turns on and configured to turn off when the first n-channel transistor of the bridge rectifier turns off, when the protection circuit is in the wireless power mode; and
an n-channel transistor coupled between the first connection node of the protection circuit and ground, wherein the n-channel transistor of the protection circuit is configured to turn on when the third n-channel transistor of the bridge rectifier turns on and configured to turn off when the third n-channel transistor of the bridge rectifier turns off, when the protection circuit is in the wireless power mode, and wherein the n-channel transistor of the protection circuit is configured to turn off when the protection circuit is in the Q-factor measurement mode.

4. The wireless power system of claim 3, wherein the first n-channel transistor has a gate coupled to receive a first gate voltage; and wherein the protection circuit further comprises: an additional n-channel transistor having a source coupled to ground, a drain coupled to a second connection node through a fourth resistance, and a gate coupled to receive gate voltage that is a result of a logical-AND operation performed on the first gate voltage and a pass gate enable signal; a third resistance coupled between the rectified voltage node and the second connection node; and a zener diode having a cathode coupled to the rectified voltage node and an anode coupled to the second connection node; wherein the second connection node is coupled to a gate of the p-channel transistor of the protection circuit.

5. The wireless power system of claim 3, wherein the p-channel transistor of the protection circuit has a size equal to a given fraction of a size of the first n-channel transistor of the bridge rectifier; wherein the n-channel transistor of the protection circuit has a size equal to the given fraction of a size of the third n-channel transistor of the bridge rectifier; and wherein a capacitance of the capacitor coupling the first connection node of the protection circuit to the first terminal of the coil is the given fraction of a capacitance of a parasitic capacitance of the coil.

6. The wireless power system of claim 1, wherein the pass gate circuit comprises a pair of pass gate transistors coupled in series between the first connection node and the sense node, the pair of pass gate transistors configured to turn on when the protection circuit is in the Q-factor measurement mode and to turn off when the protection circuit is in the wireless power mode.

7. The wireless power system of claim 1, further comprising a first resistance coupled between a supply voltage and the sense node, and a second resistance coupled between the sense node and ground.

8. The wireless power system of claim 1,
wherein the bridge rectifier comprises:
a first transistor coupled between the rectified voltage node and the first input of the bridge rectifier;

a second transistor coupled between the rectified voltage node and the second input of the bridge rectifier;
a third transistor coupled between the first input of the bridge rectifier and ground; and
a fourth transistor coupled between the second input of the bridge rectifier and ground;
wherein the protection circuit comprises:
a first transistor coupled between the rectified voltage node and the first connection node of the protection circuit, wherein the first transistor of the protection circuit is configured to turn on when the first transistor of the bridge rectifier turns on and configured to turn off when the first transistor of the bridge rectifier turns off, when the protection circuit is in the wireless power mode; and
a second transistor coupled between the first connection node of the protection circuit and ground, wherein the second transistor of the protection circuit is configured to turn on when the third transistor of the bridge rectifier turns on and configured to turn off when the third transistor of the bridge rectifier turns off, when the protection circuit is in the wireless power mode, and wherein the second transistor of the protection circuit is configured to turn off when the protection circuit is in the Q-factor measurement mode.

9. The wireless power system of claim 8, wherein the first transistor has a gate coupled to receive a first gate voltage; and wherein the protection circuit further comprises: an additional transistor having a first conduction terminal coupled to ground, a second conduction terminal coupled to a second connection node through a fourth resistance, and a gate coupled to receive gate voltage that is a result of a logical-AND operation performed on the first gate voltage and a pass gate enable signal; a third resistance coupled between the rectified voltage node and the second connection node; and a zener diode having a cathode coupled to the rectified voltage node and an anode coupled to the second connection node; wherein the second connection node is coupled to a gate of the first transistor of the protection circuit.

10. The wireless power system of claim 9, wherein the second transistor of the protection circuit has a size equal to a given fraction of a size of the first transistor of the bridge rectifier; wherein the first transistor of the protection circuit has a size equal to the given fraction of a size of the third transistor of the bridge rectifier; and wherein a capacitance of the capacitor coupling the first connection node of the protection circuit to the first terminal of the coil is the given fraction of a capacitance of a parasitic capacitance of the coil.

11. A method of operating a wireless power system including a bridge rectifier, the method comprising:
in a wireless power mode:
receiving a time-varying electric field at a coil;
operating a bridge rectifier to rectify an AC signal induced in the coil by the time-varying electric field to produce a rectified voltage at a voltage rectification node;
clamping a first connection node coupled to the coil by a capacitance to ground when a low-side transistor of the bridge rectifier is coupled to ground; and
connecting the first connection node to the rectified voltage when a high-side transistor of the bridge rectifier directly electrically connected to the low-side transistor is turned on.

12. The method of claim 11, further comprising, in a Q-factor measurement mode:
turning off high-side transistors of the bridge rectifier, and turning on low-side transistors of the bridge rectifier;
turning on pass gate transistors to couple the first connection node to a sensing node;
exciting the coil;
ceasing to excite the coil, and sensing a voltage at the first connection node; and
determining a Q-factor of the wireless power system based upon the voltage sensed at the first connection node.

13. A wireless power system, comprising:
first and second coil terminal nodes;
a bridge rectifier having a first input and a second input coupled to the first coil terminal node and the second coil terminal node, respectively, and having an output coupled to a rectified voltage node;
an excitation circuit coupled to the first input of the bridge rectifier;
a protection circuit having a first connection node coupled to the first coil terminal node through a capacitor,
wherein the protection circuit, when in a Q-factor measurement mode, is configured to:
clamp the first connection node when the first input of the bridge rectifier is coupled to ground, and
connect the first connection node to the rectified voltage node when the first input of the bridge rectifier is coupled to a supply voltage;
wherein the protection circuit, when in a wireless power mode, is configured to be disabled; and
a pass gate circuit coupled between the first connection node of the protection circuit and a sense node.

14. The wireless power system of claim 13,
wherein the bridge rectifier comprises a first transistor pair and a second transistor pair coupled between the rectified voltage node and ground;
wherein the protection circuit comprises a pair of protection transistors coupled between the rectified voltage node and ground, with a tap between the pair of protection transistors being coupled to the first connection node of the protection circuit; and
wherein each protection transistor of the pair of protection transistors is turned on when a corresponding one of the first transistor pair of the bridge rectifier is turned on and turned off when the corresponding one of the first transistor pair is turned off.

15. The wireless power system of claim 13,
wherein the bridge rectifier comprises:
a first n-channel transistor coupled between the rectified voltage node and the first input of the bridge rectifier;
a second n-channel transistor coupled between the rectified voltage node and the second input of the bridge rectifier;
a third n-channel transistor coupled between the first input of the bridge rectifier and ground; and
a fourth n-channel transistor coupled between the second input of the bridge rectifier and ground;
wherein the protection circuit comprises:
a p-channel transistor coupled between the rectified voltage node and the first connection node of the protection circuit, wherein the p-channel transistor of the protection circuit is configured to turn on when the first n-channel transistor of the bridge rectifier turns on and configured to turn off when the first n-channel transistor of the bridge rectifier turns off, when the protection circuit is in the wireless power mode; and an n-channel transistor coupled between the first connection node of the protection circuit and ground, wherein the n-channel transistor of the protection circuit is configured to turn on when the third n-channel transistor of the bridge rectifier turns on and configured to turn off when the third n-channel transistor of the bridge rectifier turns off, when the protection circuit is in the wireless power mode, and wherein the n-channel transistor of the protection circuit is configured to turn off when the protection circuit is in the Q-factor measurement mode.

16. The wireless power system of claim 15, wherein the first n-channel transistor has a gate coupled to receive a first gate voltage; and wherein the protection circuit further comprises: an additional n-channel transistor having a source coupled to ground, a drain coupled to a second connection node through a fourth resistance, and a gate coupled to receive gate voltage that is a result of a logical-AND operation performed on the first gate voltage and a pass gate enable signal; a third resistance coupled between the rectified voltage node and the second connection node; and a zener diode having a cathode coupled to the rectified voltage node and an anode coupled to the second connection node; wherein the second connection node is coupled to a gate of the p-channel transistor of the protection circuit.

* * * * *